United States Patent Office 2,839,364
Patented June 17, 1958

2,839,364

CLARIFYING TITANIUM SULPHATE SOLUTIONS

John J. Libera, East St. Louis, Ill., and Eckard J. Puetz and Arthur V. Schopp, Jr., St. Louis, Mo., assignors to National Lead Company, New York, N. Y., a corporation of New Jersey No Drawing. Application November 25, 1953
Serial No. 394,488

1 Claim. (Cl. 23—117)

This invention relates to the treatment of titaniferous ores. More specifically, this invention relates to the digestion of titaniferous ores and clarification of solutions thereof.

According to the well-known procedures for solubilization of titaniferous ores in order to prepare pigments and the like therefrom, the ore is first ground and "digested" or solubilized in sulfuric acid to produce a rigid digestion cake of water-soluble titanium sulfate and iron sulfate compounds, subsequently dissolved in water, treated if necessary with a reducing agent such as metallic iron to insure that all iron present is in the ferrous condition, and a little (say 1% to 2%) of the titanium is in the titanous condition, and then purified by a procedure known as "clarification."

To effect this clarification, the ore solution is treated with a sulfiding agent such as sodium hydrosulfide, ammonium sulfide or the like, which reacts with antimony already present in solution to produce a flocculent precipitate of antimony sulfide. This flocculent precipitate entrains and carries to the bottom of a settling tank the greater part of minor insoluble impurities and suspended solids, leaving a clear supernatant liquor from which high quality pigment or the like may be produced.

Sufficient antimony compound is ordinarily not present in the ore and must be added. The customary procedure for addition of antimony is to add an acid-soluble antimony compound such as the trisulfide, trioxide or pentoxide, or an ore such as stibnite, directly to the titaniferous ore at the beginning of operations. The antimony compound is digested simultaneously with the titaniferous ore, producing soluble antimony sulfate which dissolves along with the ore constituents in the subsequent water-dissolution step. As an alternative, the antimony, in acid-soluble form, may be added to the aqueous solution after digestion and dissolution of the digestion cake in water. This procedure, however, is less effective with difficultly-dissolved sources of antimony, and a relatively insoluble antimony source, such as stibnite ore, must be added prior to digestion in order to achieve good solubilization of the antimony values.

Difficulty has occasionally been experienced in that the antimony, whether added to the original ore or to the subsequent aqueous solution, apparently becomes partially unavailable for the production of the desired antimony sulfide precipitate, and the quantity of antimony necessary to produce the effective required bulk of antimony sulfide precipitate in the clarification step varies from one ore to another for reasons hitherto unexplained.

It is therefore an object of this invention to provide an improved method for treating titaniferous ores. A further object is to provide a more economical method for digesting titaniferous ores and clarifying solutions thereof. A still further object is to provide a method for treating titaniferous ores with improved utilization of the antimony values employed in clarification of solutions of said ores. Other objects and advantages will become apparent from the following more complete description and claims.

In its broadest aspects this invention contemplates a method for treating a titaniferous ore which comprises digesting said ore in sulfuric acid, dissolving the resulting reaction mass in an aqueous solvent, such as water, dilute acid or the like, purging the so-produced aqueous solution of sulfide values, dissolving an antimony compound in said solution and subsequently precipitating said antimony compound as antimony sulfide.

Methods for dissolving or digesting titaniferous ores, taking up the resulting reaction mass in water and reducing the ferric iron and a little of the titanic ion in the resulting solution are well known in the art and no particular variation from the ordinary well-known techniques is required.

The step of purging the system of sulfides may be accomplished in a variety of ways, but the simplest and most inexpensive of such ways is to simply bubble air or an inert gas through the solution for a sufficient period of time to remove substantially all of the sulfide values, which will normally be present as hydrogen sulfide. Since the solution is relatively strongly acid at this point, evolution of hydrogen sulfide takes place readily and rapidly and a few minutes of moderately vigorous aeration normally accomplishes the desired result.

Other methods of removing the sulfide values prior to digestion, while not ordinarily as convenient, are equally effective. For example, it has been found that the sulfide values, prior to reduction, are apparently associated with the "mud" or undissolved residue, which consists mainly of insoluble gangue and the like, together with some unattacked ore. If this mud is removed, for example by filtering, before the solution is reduced, hydrogen sulfide is not formed when reduction takes place. Under these conditions, the antimony may be added at any point after filtration of the solution, even, if desired, prior to reduction of the solution.

After the sulfide values have been substantially eliminated, the antimony values may safely be added in any acid-soluble form. Antimony trioxide is preferred from the economic standpoint. After the antimony is dissolved, the sulfiding agent such as sodium or ammonium sulfide may be added and will result substantially immediately in the formation of a bulky, and readily settled, flocculent precipitate of the type desired for efficient clarification. While the entire mechanism of the reactions which take place in the practice of the present invention is not completely understood, it appears that the digestion system always or substantially always contains sulfide values in varying degree. Upon reduction of the digestion solution, the sulfide values present in the system are converted to hydrogen sulfide. The appearance of hydrogen sulfide seems to take place at substantially the same time as the first appearance of trivalent titanium (i. e. after reduction of substantially all ferric iron present to the ferrous state). This hydrogen sulfide immediately reacts with the antimony if antimony is present, to produce antimony sulfide. Antimony sulfide produced in this manner, however, is not produced in a useful form since it either does not form the type of flocculent precipitate desired for clarification or, if such precipitate is formed, it is broken up and rendered useless for clarification purposes upon passage from the digestion to the clarification or settling tank.

When antimony is not present from the beginning, but is added after dissolution of the digestion cake in water and subsequent reduction of the iron values, hydrogen sulfide is formed and remains in solution until antimony is added, at which point it forms antimony sulfide. This antimony sulfide is, however, also useless for clarification purposes, for the same reasons as discussed above.

When hydrogen sulfide is removed prior to the addition of antimony, on the other hand, no precipitation of antimony sulfide takes place until additional introduction of sulfide values. Since the sulfiding agents are customarily added directly to the settling tank, there is no possibility for the flocculent precipitate to be broken up and rendered useless, and good clarification is obtained with minimum expenditure of antimony.

By way of illustrating the application of the process of the present invention to the treatment of the titaniferous ores for the purpose of manufacturing pigments for example, the following examples are presented:

*Example I*

22.5 tons of ilmenite ore, 38.25 tons of 93.0 percent sulfuric acid and 2.06 tons of water were reacted in the usual way to produce a titanium sulfate digestion cake. This cake was then dissolved in 52.8 tons of water and the iron therein was reduced to the ferrous state by immersing scrap iron in the solution until analysis of the solution showed 3.0 grams per liter of trivalent titanium (calculated at $TiO_2$) to be present. The solution was then stripped of hydrogen sulfide by passing air into the bottom of the tank at an approximate rate of 125 cubic feet per minute for 120 minutes, at the end of which time evolution of $H_2S$ had substantially ceased as indicated by failure to darken a piece of lead acetate test paper. The solution was again analyzed for reduced titanium values and 3.0 grams per liter of trivalent titanium (as $TiO_2$) were still present. 15 lbs. of antimony trioxide, $Sb_2O_3$, were then added to and dissolved in the solution, and the solution was pumped over into a clarification settling tank equipped with means for introduction of sodium hydrosulfide solution.

14.4 cubic ft. of 11 grams-per-liter sodium hydrosulfide were added to the solution in the settling tank and a large bulk of flocculent antimony sulfide precipitate was formed. This precipitate settled rapidly to the bottom of the tank carrying with it the suspended solids in the solution and leaving a clear supernatant liquid.

By way of comparison, the above procedure was repeated but omitting the step of purging the system of hydrogen sulfide by blowing with air. The amount of antimony sulfide produced upon subsequent clarification was approximately 6% of the amount produced when hydrogen sulfide was removed, and was insufficient to clarify the titanium sulfate solution satisfactorily.

Using this test as a guide the procedure was once more repeated using 60 lbs. (4 times as much as before) of antimony trioxide. Upon addition of sodium hydrosulfide in the subsequent clarification step, the amount of antimony sulfide precipitate formed was approximately equal to that employed when using the smaller amount of antimony oxide but with removal of hydrogen sulfide, and the solution was satisfactorily clarified.

*Example II*

The procedure of Example I was repeated, except that the reduction of the digestion solution was accomplished not by scrap iron, but by the addition of 4.2 tons of a metallized ilmenite ore containing 24% of metallic iron, according to the procedure described in U. S. Patent No. 2,416,216 to Carl W. Rau and Francis E. Swartz, Feb. 18, 1947. The solution containing the metallized ilmenite was then agitated with air as described in Example I, until evolution of $H_2S$ was substantially complete. At this point the solution was analyzed for trivalent titanium and was found to contain 3 grams per liter trivalent titanium, expressed as $TiO_2$. Antimony in the form of 15 pounds of antimony trioxide, $Sb_2O_3$, was then added to and dissolved in the solution, and the solution was pumped into a clarification tank and clarified as in Example I, using 14.4 cubic feet of 11 grams-per-liter sodium hydrosulfide solution. Results were substantially the same as those described in Example I.

Comparative laboratory tests were performed by clarifying in the laboratory a sample taken from the above batch before addition of the metallized ilmenite and reduced in the laboratory with the same metallized ilmenite, but without aeration during reduction, and a sample taken from the above large batch after the aeration step. The non-aerated sample was found to require about 4 times as much antimony as the aerated sample, for the same degree of clarification.

*Example III*

The procedure of Example I was repeated, except that the solution was filtered after dissolution of the digestion cake in water, and before reduction of the ferric iron values. No aeration was employed, and no evidence of $H_2S$ formation was noted. The reduced solution was clarified as in Example I, with substantially the same results.

*Example IV*

The procedure of Example III was repeated, with the exception that the antimony was added to and dissolved in the solution after the filtration, and prior to the reduction step. Results were again substantially the same.

The method of the present invention provides substantial economies in the treatment of titaniferous ores using antimony as a clarifying agent, the magnitude of the economy depending to some extent upon the amount of sulfide contamination present in the system and upon the degree of clarification required. Most, if not all titaniferous ores contain minor quantities of sulfides, and additional sulfide contamination is frequently introduced with the scrap iron or other reductant employed to reduce the digestion solution. All of these sulfides are capable of consuming and wasting equivalent quantities of costly antimony, but are prevented from doing so by the process of this invention. The savings thus effected are frequently considerable.

Other methods than purging with air or inert gas are also available for removing the sulfide values from the digestion solution prior to addition of the antimony. The solution may, for example, be subjected to reduced pressure (after reduction) in a vacuum vessel or the like, and the $H_2S$ removed in this way, or the sulfide values may be precipitated with other and less expensive precipitants than antimony, e. g. lead etc. Because of the ease and economy of removing sulfides by the aeration method, however, this latter procedure is greatly to be preferred.

While this invention has been described and illustrated by the examples shown, it is not intended to be strictly limited thereto, and other variations and modifications may be employed within the scope of the following claim.

We claim:

A method for treating a titaniferous ore containing sulfide compounds which comprises digesting said ore in sulfuric acid, dissolving the resulting soluble constituents of said reaction mass in an aqueous solvent, reducing the ferric iron values in said solution to ferrous iron without removing the insoluble constituents of said reaction mass, said sulfide compounds thus forming $H_2S$, removing by aeration said $H_2S$ from said solution, dissolving in said solution an antimony compound soluble in said solution and subsequently adding a sulfiding agent to the solution and forming a precipitate of antimony sulfide, said antimony sulfide precipitate being present in said solution in sufficient amount to produce the required bulk to clarify said solution.

References Cited in the file of this patent

UNITED STATES PATENTS

| | | |
|---|---|---|
| 1,633,621 | Blumenfeld | June 28, 1927 |
| 2,280,590 | Krchma | Apr. 21, 1942 |
| 2,287,861 | L'Roche et al. | June 30, 1942 |
| 2,344,288 | Dahlstrom | Mar. 14, 1944 |
| 2,413,641 | McAdam | Dec. 31, 1946 |
| 2,414,049 | Lewis | Jan. 7, 1947 |